Sept. 5, 1944.    E. J. RICARD    2,357,288
ELECTRIC TOASTER
Filed Nov. 25, 1941    3 Sheets-Sheet 1
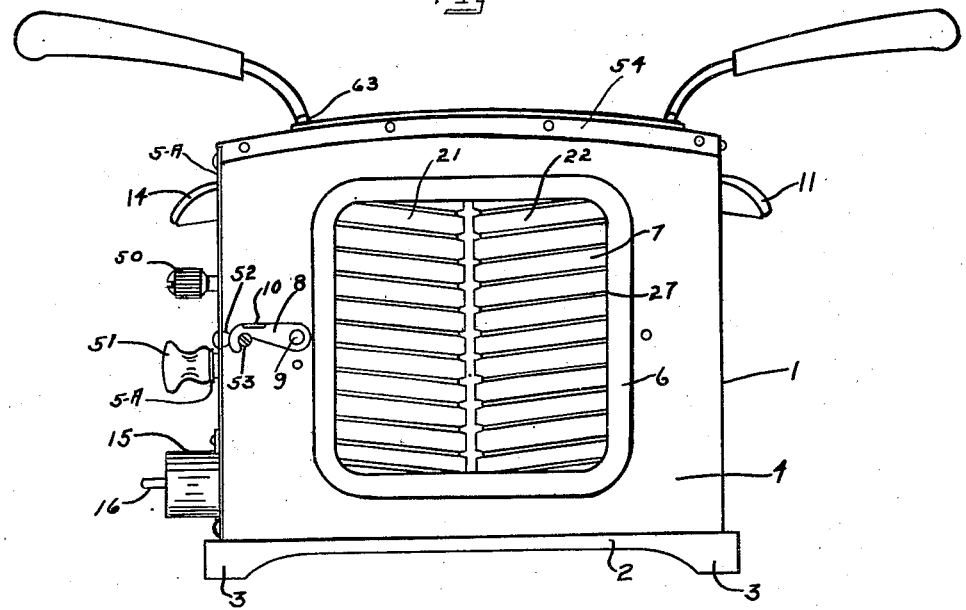
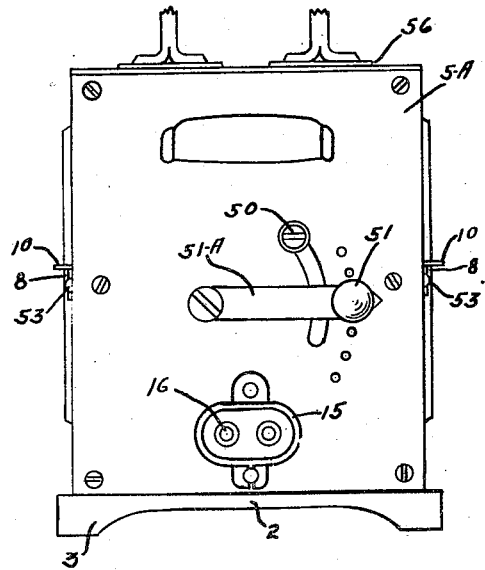 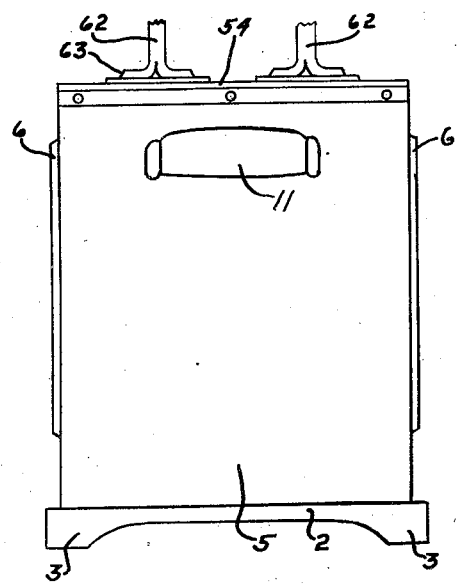
INVENTOR:
ELZEAR J. RICARD.
By Grover C. Hill,
ATTORNEY.

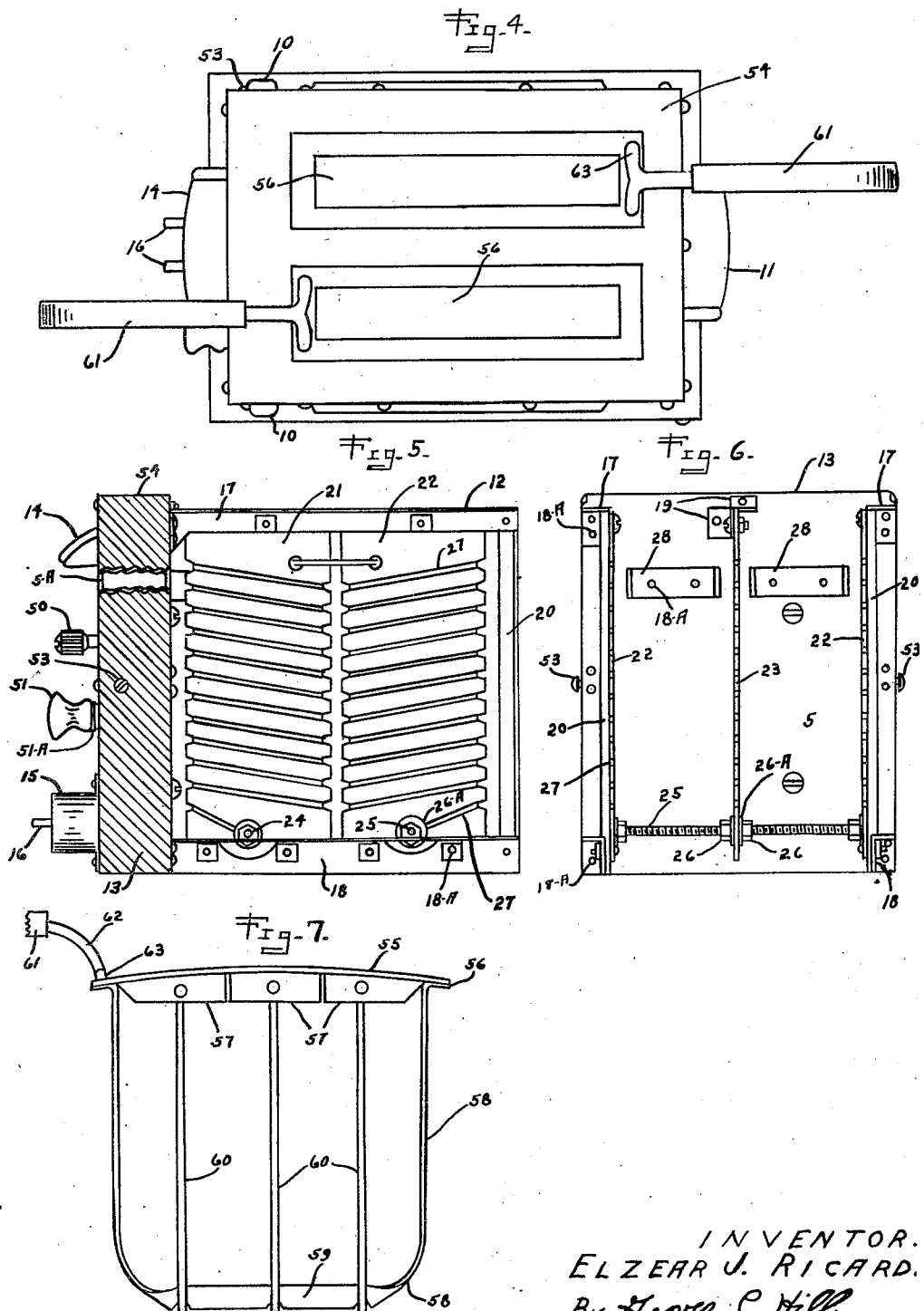

Sept. 5, 1944.　　　　E. J. RICARD　　　　2,357,288
ELECTRIC TOASTER
Filed Nov. 25, 1941　　　3 Sheets-Sheet 3
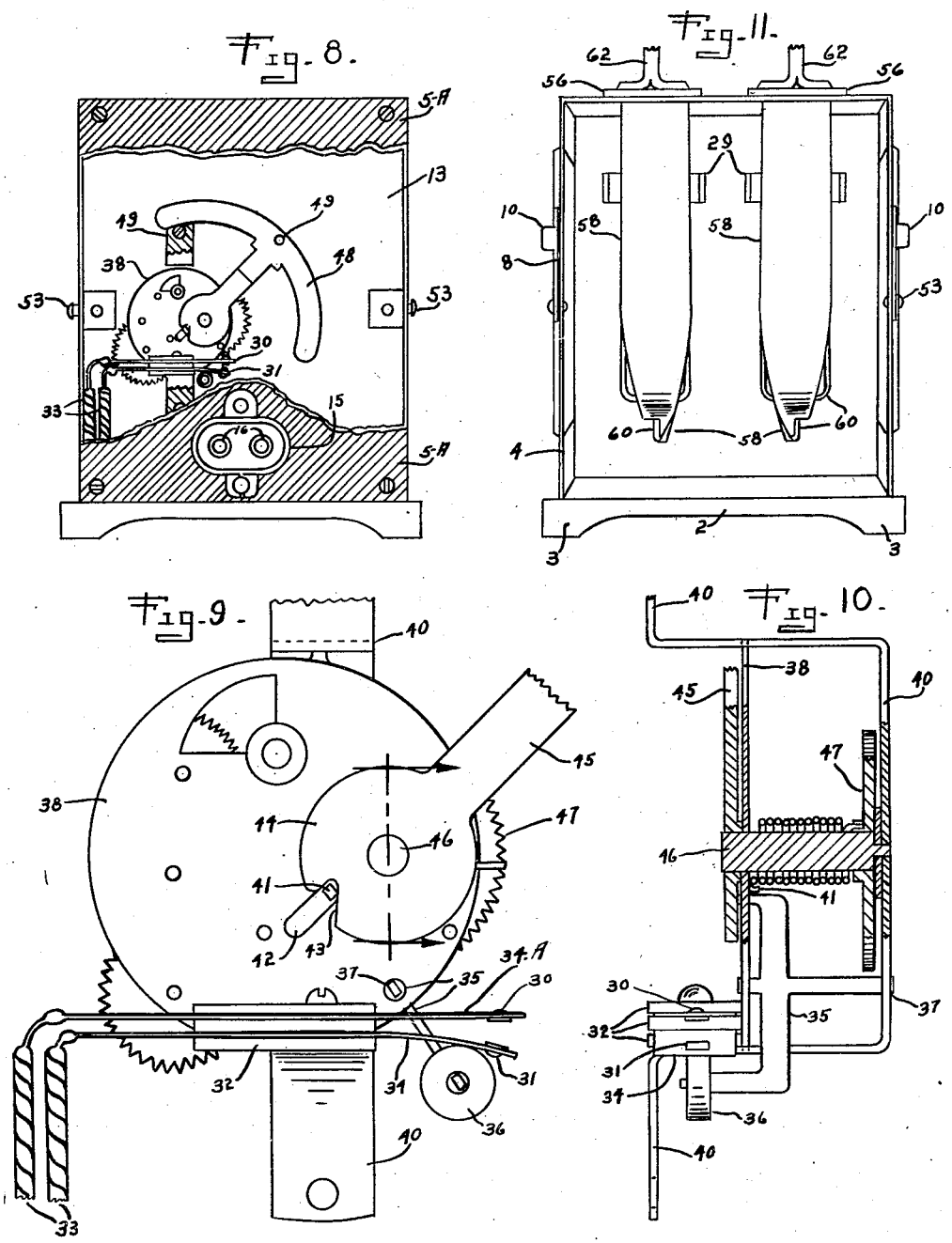
INVENTOR:
ELZEAR J. RICARD.
By Grover C. Hill
ATTORNEY Patented Sept. 5, 1944

2,357,288

UNITED STATES PATENT OFFICE 2,357,288

ELECTRIC TOASTER

Elzear J. Ricard, Detroit, Mich.

Application November 25, 1941, Serial No. 420,402

2 Claims. (Cl. 219—19)

This invention relates to improvements in the art of electrical household appliances and more particularly to electric toasters.

The primary object of the invention is to provide such a device wherein the heating element may be removed as a unit from a principal frame so as to permit of ready removal of particles, such as, for example, crumbs and the like, which may have become separated and fallen from bread or similar matter toasted.

In carrying out this primary object, the present invention further contemplates additional features in the nature of improvements upon the device covered by U. S. Letters Patent No. 2,181,204, dated November 28, 1939.

Among these features are a novel heating element frame embracing improved supporting and assembling details providing an easily assembled unit of rugged and durable, yet uncomplicated characteristics; current-bearing connections effecting both structural and current carrying capacities with no interference to use; improved removable slice carrier structure and cooperating guiding elements insuring of proper and definite spacing of the matter being toasted relative to the heating elements; manually pre-set time control arrangement so disposed with respect to the heating unit as not to interfere with removal and reassembly, and at the same time embodying readily accessible and settable control elements; simplified retention and control thereof, of the removable heating unit with respect to the principal frame; and other details which will clearly be apparent from the following detailed description, yet withal providing a compact device of attractive and neat appearance.

The foregoing features are incorporated in an exemplary embodiment illustrated in the accompanying drawings, as described in detail hereinafter and more fully pointed out in the claims.

Referring to the drawings:

Fig. 1 is a side elevation of an assembled, complete toaster with the slice carrying frames or toast lifters in position as embodied in a plural slice toaster;

Fig. 2 is a front end elevation of the toaster showing the exterior heating control elements with only fragmentary portions of toast lifters visible;

Fig. 3 is a rear end elevation;

Fig. 4 is a plan view of the assembly shown in Fig. 1;

Fig. 5 is a side elevation of the heating element frame unit removed from its principal carrying or supporting base;

Fig. 6 is an end elevation of the heating frame looking forward toward the control section;

Fig. 7 is a side elevation of a bread slice holder with only a fragment of its handle showing.

Fig. 8 is a fragmentary sectional view of the interior control mechanism embodied in the forward portion of the heating unit;

Fig. 9 is a fragmentary enlargement of the major interior control structure;

Fig. 10 is a side elevation of the same with parts being shown in section, the latter being taken substantially along the line 10—10 of Fig. 9; and Fig. 11 is an end elevation looking into the principal case or base from its open forward portion to the rear wall with the heating element frame unit removed;

The invention as embraced in the illustrated example is embodied in a principal support or frame 1, comprising a base 2 terminating at its corners in feet 3. Extending upwardly from base 2 are a pair of opposed side walls 4 connected across the rear by an end wall 5, leaving the front open-ended 5A. The side walls 4 are each provided with a sight opening frame 6 accommodating a transparent plate 7, which may be retained in frame 6 in any desirable or approved manner. On the exterior and at the forward end of each wall 4, there is provided a pivoted hook 8 carried upon a pin or rivet 9 and having a finger-grip portion 10. The purpose and object of hook 8 will be explained hereinafter. Lift or pull handle 11 extends outwardly and rearwardly from the end wall 5.

For insertion into the open end of principal frame 1, there is provided a removable heating element unit generally indicated at 12 consisting of a front housing 13 from the front wall 5A of which extends a lift or pull handle 14 and a protective shield 15 adapted to encase electrical outlet posts 16. Extending rearwardly from the rear wall of housing 13 and adjacent each corner are top rails 17 and bottom rails 18, which are suitably secured to the housing in any desired manner, or by riveting 18A, as shown. An intermediate upper rail 19 is also secured to housing 13. The corner rails are vertically reinforced at their outer rear ends by brace rails 20 connected thereto in any approved manner. Rails 17 and 18 support between them vertical side heating elements, comprising suitable notched refractory plates 21, 22 anchored thereto in any desired manner, and a similar pair of plates 23 are suspended from the intermediate upper rail 19. At their lower ends, plates 21, 22 and 23 are cross-connected by threaded rods 24, 25, each suitably supported in plates 21 and 22 and extending through plates 23, the latter being retained in properly fixed relation thereto and in proper spaced relation from plates 21, 22 by means of nuts and washers 26 and 26A. Each of the pairs of plates supports a spirally wound high resistance wire 27 electrically connected to rod 24 at one end, thence spirally upward about the notches of the front plate of each set, and passing through an aperture adjacent the top thereof and a similar wire through the rear one, and thence spiralling downwardly and terminating in electrical connection with rod 25. Obviously, any other preferred winding of the wire may be employed. Rods 24, 25 are electrically connected to a control mechanism situated in housing 13 which will be hereinafter explained.

To insure of proper spaced guidance of a removable slice holder, a pair of rearwardly directed channel guide brackets 28 are secured to the rear wall of housing 13 in the spaces between the three sets of heating element plates. A similar set of brackets 29 (Fig. 11) may be provided on the forward side of wall 13 to extend in complementary opposed relation to brackets 28.

As pointed out above, the heating element unit frame 12, by virtue of suitable bracing and reinforcing of the rails, presents a rigid, substantial structure. Rods 24, 25 serve at the same time a two-fold purpose. They support the middle element plates 23 and reinforce the plates at their lower ends and in addition, constitute the sole electrical connecters between the heating wires of the three sets of heating elements. By being of rod material, they are not easily damaged and being disposed adjacent the bottom of the unit, they will not interfere with the ready insertion and extraction of a slice carrier. Since these rods are threaded and carry threaded anchoring means thereon, adjustable securement of all plates relative to each other is effectively provided for.

Disposed within housing 13, is a manually settable, automatic control mechanism designed to provide for a wide range of timed heat application, whereby a user may select the toasting effect desired. This mechanism may include a pair of spring contacts 30, 31, suitably carried in a dielectric support 32 and having connected thereto suitable leads 33 controlling electrical continuity from the posts 16 to the heating wires 27. The lowermost contact 31 supporting arm 34 is resiliently turned downwardly to be normally urged away from contact 30 and arm 34A, to effect contact of the two, there is provided a control arm 35 carrying a dielectric cam roller 36. Arm 35 is suitably pivotally supported by trunnions bearing 37 in openings provided therefor in spaced frame plates 38 and frame 40, the latter terminating in securing flanges 40 by means of which the mechanism frame may be supported in housing 13. The upper end of arm 35 terminates in a lug or extension 41 extending through a slot 42 in plate 38 and projecting therebeyond for controllable positioning by a notch 43 in a circular heel 44 of a control lever 45 secured to the protruding end of a shaft 46 journalled in plates 38 and 39. This shaft may be the cannon pinion shaft of any suitable clockwork mechanism, generally indicated as 47. Since the clockwork employed forms no part of this invention, except as it affects desired control of the switch mechanism contacts, the details thereof have been omitted for any number of such suitable control devices are available in the open market and may readily be adapted for the purpose. While a horologic type of device is preferable, any other type of settable control may be employed, such for example, as an electrical or mechanical thermostat, etc.

Control lever 45 may terminate at its extremity in an arcuate part 48 adapted to cooperate with a limiting stop device 49 settable from the exterior of housing 13 by means of a knob 50, and itself having an exterior knob 51 carried upon an exterior arm 51A secured to shaft 46 by means of which, closing of the switch contacts 30, 31 may be effected. It should be noted that in the removable unit thus far described, all control parts are safely encased in housing 13, while the heating elements have short direct electrical connections with the control switch. The primary electrical connections 24, 25 for the resistance heater wires 27 are all adjacent the bottom and well out of the way of any moving parts. Since the unit is removable, it may be readily serviced when removed.

To effect proper alignment of the unit 12 in its assembly to the principal frame, the walls 4 are each provided with slots 52 (see Fig. 1) which slidably receive pins or studs 53 projecting outwardly from the side walls of housing 13. When these studs have been slid home into slots 52, hooks 8 may be swung by grasping the grips 10 to engage the studs thereby, restraining separation of the removable unit 12 and principal frame 1.

Principal frame 1 has a cover 54 straddling the side walls and end wall and may be suitably secured thereto in any desirable or preferred manner. This cover is preferably provided with two spaced parallel openings in alignment with the spaces between the heating elements of the heating unit 12 and with which brackets 28 and 29 are in turn aligned. While two such openings are illustrated, it is clear that any number may be employed. Each of these openings or passages may receive a toastable material holder 55 which, for the sake of ready reference, will hereinafter be referred to as a bread or slice lifter.

Referring more particularly to Fig. 7, each such lifter 55 comprises an upper open center plate 56, the opening of which is of such shape and size as to accommodate sliced bread or the like, and may be otherwise contoured to match the contour of cover 54 of the principal frame to present a neat appearance. Plate 56 has depending side flanges 57 and an end frame 58, generally of U-shape depending therefrom, with its bight portion being concavely curved to present a saddle 59. To restrain sideward movement of a slice of bread while being inserted or toasted, a plurality of U-shaped guard wires or rods 60 have their legs anchored in flanges 57 with their bight portions embracing saddle 59. These may or may not be secured to the saddle but, obviously, the former would more substantially rigidify the entire lifter. A handle 61 of insulating material extends upwardly and outwardly from one end of plate 56 upon a shank or stem 62 suitably secured to the plate by opposed extensions 63. In use, the lifters are preferably inserted into the toaster with the handles extending in opposite directions, although it will be obvious that they may extend in the same direction, should it be desired to remove the lifters simultaneously with one hand.

Having thus described a preferred embodiment, it is to be understood that it is merely exemplary and illustrative of the features mentioned hereinbefore. Obviously, any modification embracing these desirable features of the invention sought to be protected by Letters Patent may be made by those skilled in the art during any probable development for marketing purposes. Such would consistently fall within the spirit and scope of the appended claims.

Having thus fully described my invention, what I claim as new is:

1. In an electric toaster having a removable heating unit, a principal frame, one side of said frame having spaced openings for receiving material to be toasted, another side of said frame at right angles to said first mentioned side having an opening adapted to receive said removable heating unit, said heating unit comprising a front housing forming a closure for said open side of said frame when said heating unit is in operating position, parallel rails extending from and supported on said front housing in a direction and position for sliding contact on the interior surfaces of said frame, heating elements supported on said horizontally disposed rails spaced between and at the sides in relationship with said spaced openings, and connectors near the bottom of said heating elements serving to space and assist in support of said heating elements and to form electrical connections therebetween while leaving an unobstructed space between said elements adjacent the top portions thereof.

2. In an electric toaster, a principal frame, a removable heating unit adapted to be telescopically received by said principal frame comprising, a front housing, rail members supported upon and extending horizontally from said front housing in a direction and position for sliding contact on the interior surfaces of said frame, electrical heating elements supported vertically on said rail members and spaced from said principal frame by said rail members in contact with but free to slide relative to said principal frame, spacing members extending between the lower portions of said heating elements spacing and supporting said heating elements and also serving as electrical connectors, thereby providing spaced heating elements having unobstructed spaces between adjacent heating elements to receive material to be toasted.

ELZEAR J. RICARD.